(12) United States Patent
Kyllingstad

(10) Patent No.: US 7,130,751 B2
(45) Date of Patent: Oct. 31, 2006

(54) METHOD AND DEVICE FOR DETECTING LEAKS IN RECIPROCATING MACHINERY

(75) Inventor: Åge Kyllingstad, Algård (NO)

(73) Assignee: National Oilwell Norway AS (NO)

( * ) Notice: Subject to any disclaimer, the term of this patent is extended or adjusted under 35 U.S.C. 154(b) by 0 days.

(21) Appl. No.: 10/510,586

(22) PCT Filed: Apr. 10, 2003

(86) PCT No.: PCT/NO03/00116

§ 371 (c)(1),
(2), (4) Date: Oct. 8, 2004

(87) PCT Pub. No.: WO03/087754

PCT Pub. Date: Oct. 23, 2003

(65) Prior Publication Data

US 2005/0125171 A1 Jun. 9, 2005

(30) Foreign Application Priority Data

Apr. 12, 2002 (NO) ................................ 20021726

(51) Int. Cl.
*G01M 3/04* (2006.01)

(52) U.S. Cl. ............................ 702/77; 702/50; 702/51; 702/75; 73/40

(58) Field of Classification Search ................. 702/77, 702/45, 50, 51, 55, 100, 114, 113, 75, 76, 702/127, 151, 183, 185, 189–191; 73/1.16, 73/40, 40.5 R, 602, 542, 579, 861, 861.02, 73/861.03, 195, 149

See application file for complete search history.

(56) References Cited

U.S. PATENT DOCUMENTS

| 4,635,469 | A | * | 1/1987 | Modera et al. ................. 73/40 |
| 5,091,716 | A | * | 2/1992 | Nelson et al. .............. 340/605 |
| 5,146,433 | A | * | 9/1992 | Kosmala et al. .............. 367/83 |
| 5,203,822 | A | | 4/1993 | Gurich et al. ................. 73/149 |
| 5,471,400 | A | | 11/1995 | Smalley et al. ................ 702/51 |
| 5,650,943 | A | | 7/1997 | Powell et al. ................. 702/51 |
| 5,720,598 | A | | 2/1998 | de Chizzelle ................ 417/53 |
| 5,927,243 | A | * | 7/1999 | Cikanek et al. .......... 123/193.2 |
| 6,068,588 | A | * | 5/2000 | Goldowsky ................... 600/16 |

* cited by examiner

*Primary Examiner*—Hal Wachsman
(74) *Attorney, Agent, or Firm*—Andrus, Sceales, Starke & Sawall, LLP

(57) ABSTRACT

A method of and device for detecting a leak in reciprocating machinery, comprising at least two pistons, by the volume flow at least out of the reciprocating machinery being monitored and analysed, e.g. by means of Fourier analysis, in order to make it possible to detect a flow component, where the flow component has a frequency that differs from the fundamental frequency of the reciprocating machinery, the fundamental frequency of the reciprocating machinery being constituted by the rotational frequency of the reciprocating machinery multiplied by the number of pistons in the reciprocating machinery.

9 Claims, 3 Drawing Sheets

METHOD AND DEVICE FOR DETECTING LEAKS IN RECIPROCATING MACHINERY

CROSS REFERENCE TO RELATED APPLICATION

The present application is the U.S. national stage application of International Application PCT/NO03/00116, filed Apr. 10, 2003, which international application was published on Oct. 23, 2002 as International Publication WO 03/087754. The International Application claims priority of Norwegian Patent Application 20021726, filed Apr. 12, 2002.

BACKGROUND OF THE INVENTION

This invention regards a method of detecting a leak in a piece of reciprocating machinery. The method may also be used for localising a leak. In this context, reciprocating machinery means all types of pumps and hydraulic machineries that are equipped with a rotating crankshaft or cam, where the crankshaft or cam drives or is driven by at least two pistons in a controlled reciprocating motion, and where each piston cylinder is provided with at least two check valves designed to rectify the direction of flow through the machine. The invention also comprises a device for implementing the method.

When operating reciprocating machinery, safety considerations and economics make it very important to detect leaks in e.g. piston seals and valves at an early stage. Leaks of this type are acceleratory, and when they become large enough for the operator of the reciprocating machinery to detect them through large abnormal pressure variations, the reciprocating machinery must often be shut down and overhauled immediately and without the option of postponing the maintenance work to a later and operationally more suitable time.

SUMMARY OF THE INVENTION

The object of the invention is to present a method of detecting an incipient leak before it reaches an extent that interferes with the operation, whereby repairs may be scheduled for a later point of time.

The object is achieved in accordance with the invention by the characteristics given in the description below and in the appended claims.

The method comprises an analysis of the flow rate into and out of the reciprocating machinery in order to detect a new flow rate component, where the flow rate component has a frequency that differs from the fundamental frequency of the reciprocating machinery. Fundamental frequency is here taken to mean the rotational frequency of the reciprocating machinery multiplied by the number of pistons in the machine. The flow rates may be estimates based on pressure measurements.

Ideally, the flow rates into and out of the reciprocating machinery should be as steady as possible, but in practice the flow rates, and consequently the pressure, will fluctuate in correlation with the speed of rotation of the machinery. Such fluctuations are principally caused by geometric factors that cause the sum of the piston speeds in each phase not to be constant, the compressibility of the fluid which makes it necessary to compress and then decompress the fluid prior to equalising the pressure and opening the respective valves, valve inertia that cause further delays in the opening and closing of valves, and flow-dependent pressure drop through valves and feed passages. If all pistons and valves are identical and operate normally, the fluctuations will as a result of symmetry have a fundamental frequency equal to the rotational frequency of the machinery multiplied by the number of pistons in the machine. However, if an abnormal leak were to occur in e.g. one of the pistons or one of the valves, the symmetry would be broken and the fluctuations in the flow would have new frequency components, with the lowest frequency equal to the rotational frequency of the machine.

The angular position θ of the rotating crankshaft or cam of the reciprocating machinery is measured directly or indirectly and normalised to values of between 0 and $2\pi$, optionally between $-\pi$ and $\pi$ radians, where 0 represents the start of the power stroke of piston no. 1. The reciprocating machinery comprises two or more pistons uniformly distributed, so that piston no. i of a total of n pistons has a phase lag (angle) of $(i-1)2\pi/n$ relative to the first piston.

The pressure into or out of the machinery is measured, whereupon the measured pressure signals are transformed into functions representing normalised flow rates into and out of the machinery. This means that if, for instance, $q_{in}$ and $q_{av}$ represent instantaneous and average flow rates into the reciprocating machinery, the normalised inflow function is defined so that $$f(p_{in}) \approx q_{in}/q_{av}.$$

It is well known to those skilled in the art that a periodic signal can be split up into components of different frequencies, e.g. by use of Fourier analysis. The $i^{th}$ harmonic component of the reciprocating machinery frequency may be represented by two coefficients defined by the following integrals:

$$s_i = \frac{1}{\pi} \int_0^{2\pi} f \sin(i\theta) d\theta \qquad (1)$$

$$c_i = \frac{1}{\pi} \int_0^{2\pi} f \cos(i\theta) d\theta \qquad (2)$$

These integrals, which in practice must be implemented as summations in a computer or in a programmable logic controller (PLC), are updated for each new revolution of the reciprocating machinery. If the function $f$ is purely periodic with the pump angle, the integrals will be constant. However, $f$ can often contain significant non-periodic components caused by e.g. a change in the pump speed or a variation in the external flow resistance. The non-periodic components may be regarded as stochastic noise, and may consequently be suppressed relative to the periodic components by use of known smoothing or averaging techniques. As an example, recursive smoothing can be applied according to the recipe $$a_i(k) = (1-x)a_i(k-1) + xs_i(k) \qquad (3)$$

$$b_i(k) = (1-x)b_i(k-1) + xc_i(k) \qquad (4)$$

where the argument refers to the estimate following revolution number k of the machinery, and x is a positive weighting function that is normally much smaller than 1. This smoothing filter, which is a low-pass filter of the first order, allows all the previous estimates of sine and cosine coefficients to form part of the estimated resultant. coefficients, but with the weighting decreasing exponentially backwards in time. If the non-periodic variations are relatively large, it may be necessary to use a second-order smoothing and/or select an even smaller weighting function x.

The amplitude of the first harmonic frequency component:

$$f_1 = \sqrt{a_1^2 + b_1^2} \qquad (5)$$

represents a quantitative measure of the leakage in the machinery. In the event of a small leak, this component will start to increase from its low normal noise level long before the leak becomes large enough for the associated pressure fluctuation to show up directly on a manometer or in a graph of the pressure signals.

The method is also well suited for locating the main source of the leak. This is possible because the Fourier analysis contains phase information through the two frequency components $a_1$ and $b_1$. The connection between the frequency components may through use of a well known trigonometric identity be expressed as $$a_1 \sin(\theta) + b_1 \cos(\theta) = f_1 \sin(\theta - \phi) \qquad (6)$$

where $$\tan(\phi_1) = a_1/b_1 \qquad (7)$$

The sign of the coefficient determines in which quadrant the angle $\phi_1$ lies.

Each type of leak has its own signature, as explained in some of the following examples. The functions $f$ and $g$ represent functions that are approximately proportional to the incoming and outgoing volumetric flow rates respectively. This means that the associated phase angles $\phi_1$ and $\gamma_1$ are direct expressions of the first harmonic component of the maxima of the fluid flows.

BRIEF DESCRIPTION OF THE DRAWINGS

The following describes several non-limiting examples of use of the method illustrated in the accompanying drawings, in which.

DETAILED DESCRIPTION OF THE INVENTION

Figure 1:
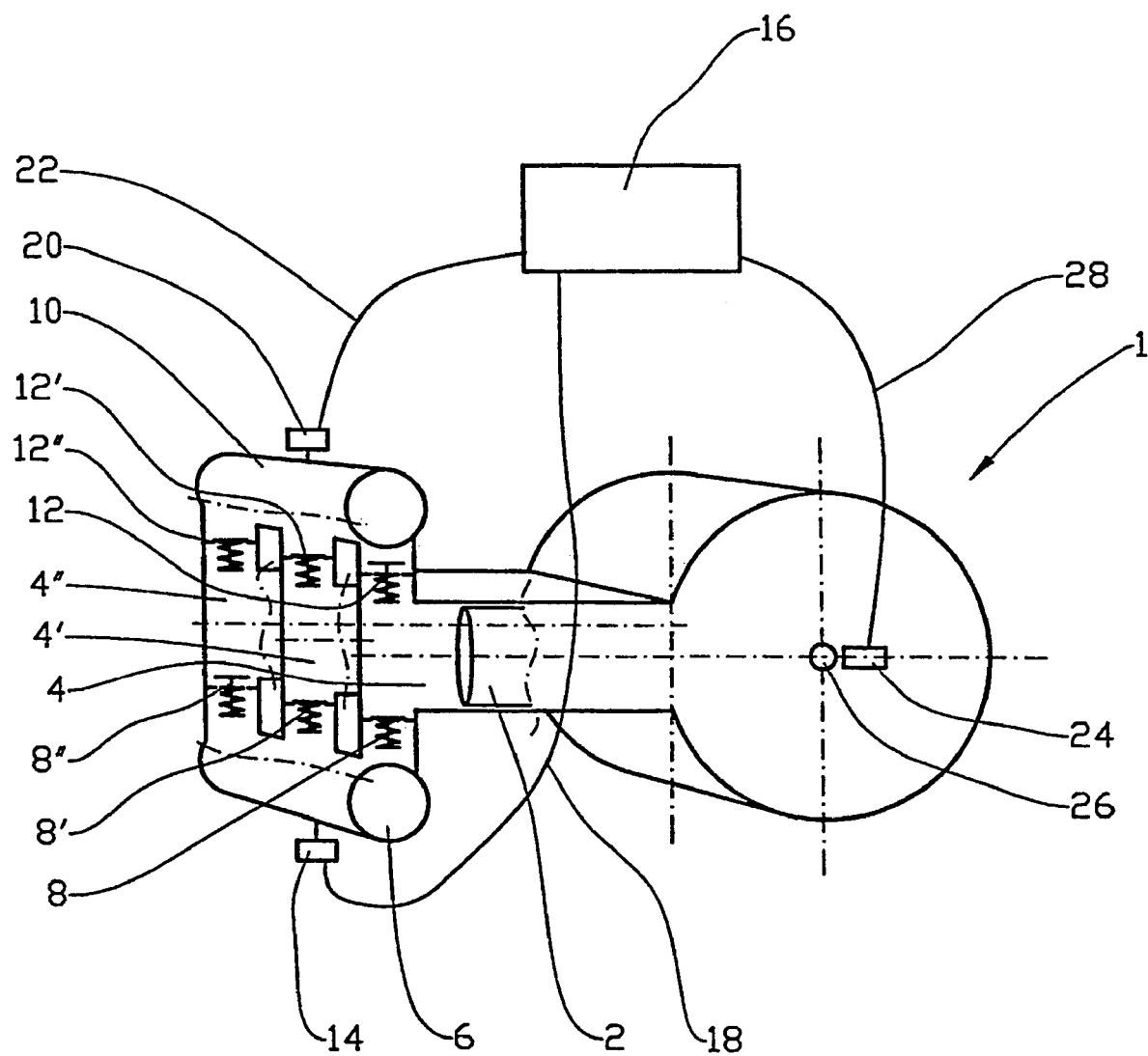
FIG. 1 schematically shows a triplex pump equipped with the required measuring devices and analysers.

In the drawings, reference number 1 denotes a so-called triplex pump equipped with three individually acting pistons 2, 2' and 2" respectively, of which only piston 2 is shown, extending through their respective cylinders 4, 4' and 4". The cylinders 4, 4' and 4" communicate with an inlet manifold 6 through their respective inlet valves 8, 8' and 8", and an outlet manifold 10 through their respective outlet valves 12, 12' and 12", respectively. An inlet pressure sensor 14 is connected to the inlet manifold 6, communicating with a computer 16 via a line 18, and an outlet pressure sensor 20 is connected to the outlet manifold 10, communicating with the computer 16 via a line 22. A rotational angle transmitter 24 is designed to measure the rotational angle of the crankshaft 26 of the pump 1, and is communicatingly connected to the computer 16 by means of a line 28. The sensors 14 and 20, the transmitter 24 and the computer 16 are of types that are known per se, and the computer is programmed to carry out the calculations concerned.

Figure 2:
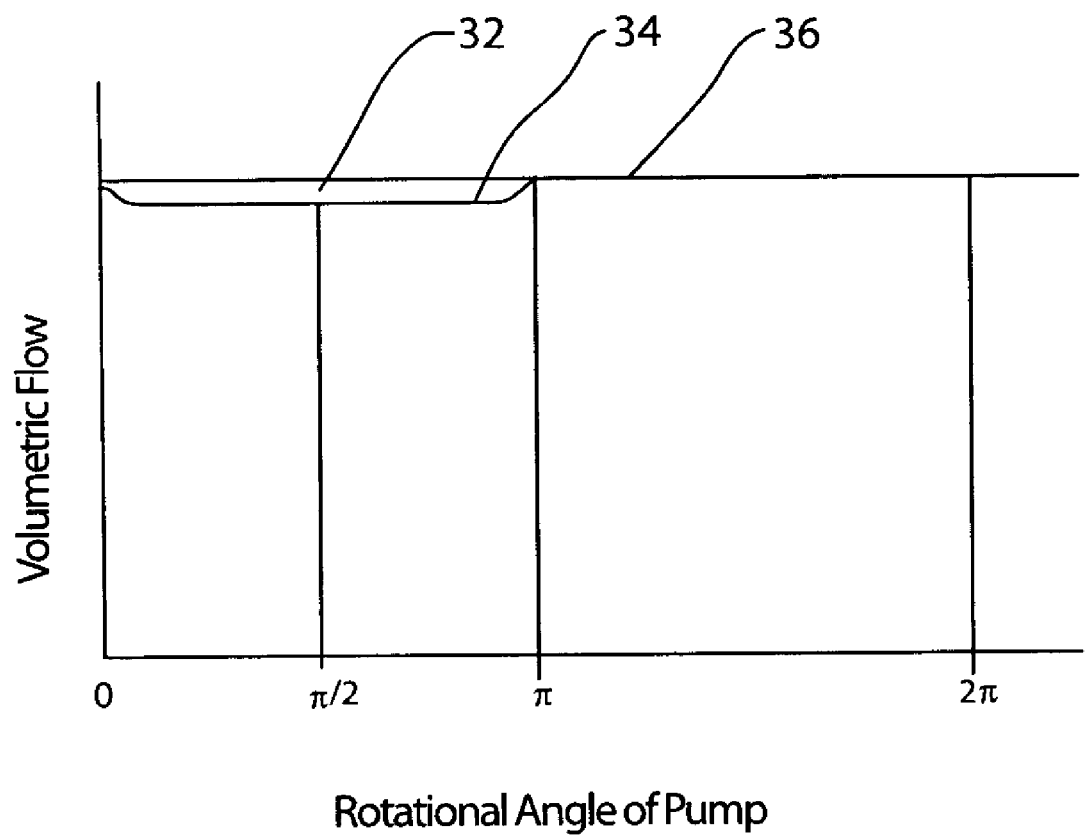
FIG. 2 shows a curve illustrating the delivered volumetric flow as a function of the rotational angle of the pump, showing the central point of a piston leak.
Figure 3:
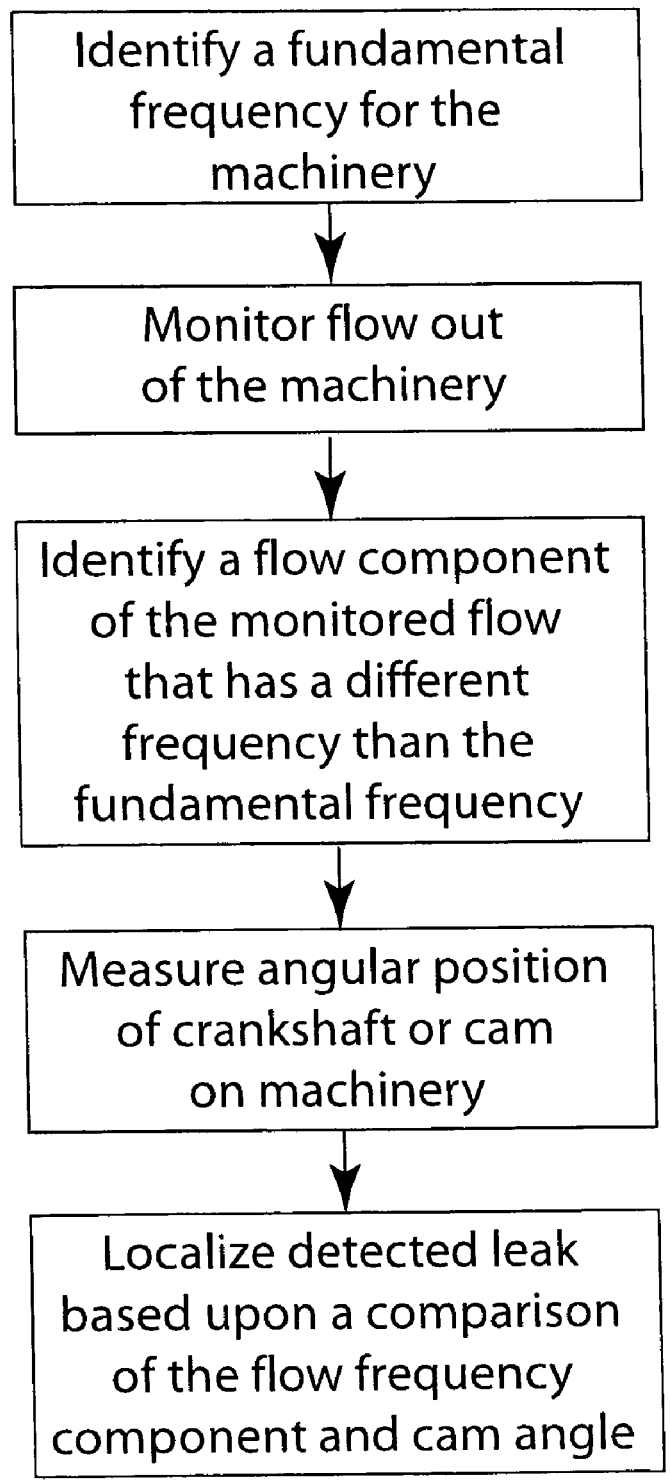
FIG. 3 shows a flow chart depicting the steps in one example of the method of the present invention.

In the event of a leak in the seal of the first piston 2, the outflow through the outlet valve 12 is reduced during the pumping phase by a quantity equal to the leakage past the piston 2. As the pump stroke extends over half a revolution of the crankshaft 26 of the pump 1, the central point 32, see FIG. 2, for this reduction in volume flow is approximately $\pi/2$ radians (90°) after the start of the pump stroke. In FIG. 2, the curve 34 indicates the reduction in the average volume flow 36 which occurs as a result of the piston leakage. In reality, the central point 32 will lag by an additional, small angle. This is due to both compression and decompression of the pumped fluid, and the fact that with a crank drive, where the crankshaft (not shown) of the piston 2 has a finite length, the maximum piston speed is reached only at approximately 100°. These effects may be calculated and compensated for by adding a pressure and geometry dependent phase lag $\delta$. The corresponding angle $\gamma_1$ on the first harmonic component of the outflow function g will therefore be shifted by half a revolution relative to that point, i.e. to $\gamma_1 = -\pi/2 + \delta$. Due to the fact that the pressure during the return or suction stroke of the piston 2 is far lower, the inflow rate, and consequently also the function $f$, will be relatively unaffected by a piston leak, whereby $f_1 \approx 0$.

The above example may easily be generalised to a rule which states that in the event of a leak in piston number i of a total of n pistons with a mutual displacement of phases of $2\pi/n$, then $$f_1 \approx 0 \qquad (8)$$

$$g_1 > 0 \qquad (9)$$

$$\gamma_1 = -\pi/2 + \delta + 2(i-1)\pi/n \qquad (10)$$

The inequality >0 here indicates that $g_1$ must be interpreted as being significantly greater than the level of background noise.

If the leak is in the inlet valve 8 instead of in the piston 2, the effect on the out function will be the same as in the case of a pure piston leak. However the drop in the outflow will now be balanced by a similarly negative inflow. It can therefore be concluded that in the event of a leak in in-valve number i, (9) and (10) will still apply, but (8) must be replaced by $$f_1 > 0 \qquad (11)$$

$$\phi_1 = \gamma_1 = -\pi/2 + \delta + 2(i-1)\pi/n \qquad (12)$$

A leak in outlet valve 12 will lead to a reduction in both the inflow and the outflow during the return phase. Then both (11) and (9) will apply, but the phase angle is displaced by half a revolution, to $$\phi_1 = \gamma_1 = \pi/2 + \delta + 2(i-1)\pi/n \qquad (13)$$

In those cases where n is an odd number, the source of the leakage will be determined uniquely. The reason for this is that the phase angles defined by equation (12) are all different from the phase angles defined by equation (13). However, if the number of pistons is an even number, the leakage determination will be two-valued, at least if the leak is in one of the valves. The reason for this is that a leak in an inlet valve number i will have the same signature is as a leak in the complementary out valve (number $i \pm n/2$) and vice versa.

The invention claimed is:

1. A method of detecting a leak in reciprocating machinery, the reciprocating machinery comprising at least two pistons that are driven by the reciprocating machinery in reciprocating motion to produce a flow of material, the method comprising the steps of:
   identifying a fundamental frequency of the reciprocating machinery, the fundamental frequency comprising the rotational frequency of the reciprocating machinery multiplied by the number of pistons in the reciprocating machinery;
   monitoring the flow of material out of the reciprocating machinery; and
   detecting a leak in the reciprocating machinery by identifying a flow component of the monitored flow of material out of the reciprocating machinery that has at least one different frequency than the fundamental frequency of the reciprocating machinery.

2. The method of claim 1, wherein the flow of material out of the reciprocating machinery is monitored by means of Fourier analysis.

3. The method of claim 1, further comprising the steps of:
   measuring an angular position of a crankshaft on the reciprocating machinery, and
   localizing the detected leak based upon a comparison of the frequency of the flow component of the monitored flow of material out of the reciprocating machinery and the angular position of a crankshaft.

4. The method of claim 1, further comprising the steps of:
   measuring an angular position of a cam on the reciprocating machinery, and
   localizing the detected leak based upon a comparison of the frequency of the flow component of the monitored flow of material out of the reciprocating machinery and the angular position of a cam.

5. An arrangement for detecting a leak in reciprocating machinery that has at least two pistons that reciprocate to produce a flow of material, the arrangement comprising:
   a fundamental frequency constituted by the rotational frequency of the reciprocating machinery multiplied by the number of pistons in the reciprocating machinery;
   at least one measuring device arranged to measure a flow value from the reciprocating machinery; and
   a computer arranged to receive the flow value from the at least one measuring device;
   wherein the computer comprises a program that detects leaks in the reciprocating machinery by identifying a flow component of the flow value that has a frequency that differs from the fundamental frequency of the reciprocating machinery.

6. The arrangement of claim 5, wherein the reciprocating machinery comprises a crankshaft driving the at least two pistons and further comprising a rotational angle transmitter coupled to the computer, the rotational angle transmitter arranged to measure an angle of the crankshaft.

7. The arrangement of claim 6, wherein the computer program is capable of localizing the leak associated with the identified flow component of the monitored flow of material out of the reciprocating machinery by analyzing the relationship between the frequency of the flow component of the monitored flow of material out of the reciprocating machinery and the crankshaft angle.

8. The arrangement of claim 5, wherein the reciprocating machinery comprises a cam driving the at least two pistons and further comprising a rotational angle transmitter coupled to the computer, the rotational angle transmitter arranged to measure an angle of the cam.

9. The arrangement of claim 5, wherein the reciprocating machinery comprises a pump.

* * * * *